(12) United States Patent
Summers, III et al.

(10) Patent No.: US 6,302,385 B1
(45) Date of Patent: Oct. 16, 2001

(54) VIBRATION ISOLATION MOUNT

(75) Inventors: Herbert Stanley Summers, III, Trotwood; David Joseph Koester, Miamisburg; Garry M. Guthrie, Springboro, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/345,240

(22) Filed: Jun. 30, 1999

(51) Int. Cl.[7] ........................................................ F16F 7/00
(52) U.S. Cl. ........................................ 267/140.3; 267/293
(58) Field of Search ............................... 267/140.3, 140.2, 267/140.5, 219, 220, 141, 141.1, 141.2–141.7, 257, 258, 153, 292, 293, 294

(56) References Cited

U.S. PATENT DOCUMENTS

| | | | |
|---|---|---|---|
| 2,457,058 | * 12/1948 | Markowitz | 267/140.3 |
| 4,858,880 | * 8/1989 | Durand | 267/140.3 |
| 5,096,153 | * 3/1992 | Seeley et al. | 267/140.3 |
| 5,110,097 | * 5/1992 | Simon | 267/141.1 |
| 5,743,509 | * 4/1998 | Kanda et al. | 267/293 |
| 5,899,431 | * 5/1999 | Lefol | 267/140.3 |

FOREIGN PATENT DOCUMENTS

613000 * 11/1948 (GB) ................................. 267/140.3

* cited by examiner

Primary Examiner—Matthew C. Graham
(74) Attorney, Agent, or Firm—Robert M. Sigler

(57) ABSTRACT

A vibration isolation mount particularly usefull for a hydraulic automotive vehicle braking system includes a shear mount, a rate washer, and a bolt and nut for clamping the shear mount and rate washer together and to the vibrating member. The shear mount is shaped to engage an opening in a support structure, such as a mounting bracket, and thereby connect the vibrating member to the support. In automotive applications, the mount reduces the amount of noise and vibration that is transmitted to the passenger compartment over prior art mounting systems while restricting travel of the accumulator plate with respect to the vehicle bracket within predetermined limits.

21 Claims, 4 Drawing Sheets

VIBRATION ISOLATION MOUNT

TECHNICAL FIELD

The present invention relates to vibration isolation mounts, and more particularly to isolation mounts useful for mounting an automotive brake system accumulator plate to a vehicle.

BACKGROUND OF THE INVENTION

Hydraulic systems generate vibrations due to the pressure waves traveling through the fluid in the system. Accordingly, it is necessary to isolate components of a hydraulic system to prevent transmission of vibrations to associated support structure. Such vibration isolation is particularly desirable in hydraulic braking systems of automotive vehicles.

Antilock brake systems ("ABS") are hydraulic braking systems for automotive vehicles that employ modulator units attached to an accumulator plate and include a motor and pumps which transfer fluid pressure from the vehicle wheels during an antilock braking event. A typical antilock brake system (ABS) senses when individual wheels on a vehicle begin to "lock-up" (i.e. cease rotation) during braking, which is an indication that those vehicle wheels are beginning to skid, usually due to adverse road conditions. Vehicle skidding is undesirable in that the vehicle stopping distance is lengthened and vehicle control is lessened. Accordingly, in order to minimize skidding, the ABS modulates hydraulic fluid flow to the vehicle wheel disc brakes that are about to lock up, thereby causing such brakes to alternate between applying and releasing braking pressure in a controlled manner at a high rate. The high rate of braking cycles creates a certain degree of vibration and noise in the ABS components; and such vibrations can be transmitted from the braking system to a vehicle body passenger cabin, especially in braking configurations where the accumulator plate is secured to the body of the vehicle or in close proximity to the passenger cabin. The problem is particularly severe during an ABS braking event, due to the frequency and force with which the flow of the hydraulic fluid is modulated. Such vibrations (and the noise they create) can be annoying and uncomfortable for the vehicle passengers, particularly in larger vehicles employing large hydraulic pumps. Additionally, the vibrations can be detrimental to the mechanical systems in the automobile, contributing to the unreliability and premature failure of these systems. Accordingly, for the above-noted reasons, it is desirable to have a mount for securing an accumulator plate to a vehicle bracket of an automobile which minimizes the vibrations transferred from the accumulator plate to the vehicle bracket, and thus to the vehicle body.

In the past, many attempts have been made to mount hydraulic braking equipment to a vehicle bracket in an automotive application with varying degrees of success. Contributing to the difficulty of the task is the dichotomy of conflicting design constraints which require a relatively "stiff" mount to provide support for the hydraulic equipment and a relatively "loose" mount for improved vibration isolation characteristics. For example, while a standard "stiff" mount (wherein the accumulator plate is bolted directly to the vehicle bracket) would provide plenty of support, it would also transmit an unacceptable amount of vibration to the vehicle bracket, and thus to the vehicle. Conversely, while a relatively "loose" mount, such as one made entirely of rubber, would provide ample vibration damping characteristics, it would unfortunately provide an unacceptably low degree of support for the modulator unit. Additional design constraints, such as the tolerance for movement within the engine compartment due to the presence of other equipment or housings, such as the shock tower, also need to be considered.

One type of prior art mounting which attempted to resolve some of these problems generally consisted of a spool-type collar, a bolt and several elastomeric washers. In this system, the spool-type collar was seated in an aperture in the vehicle bracket and the accumulator plate with the elastomeric washers mounted between the vehicle bracket and the accumlator plate to provide vibration damping characteristics. The bolt was inserted through the collar and tightened with a nut, thereby securing the accumulator plate to the vehicle bracket. While this prior art design allowed for some flexibility of travel for the accumulator plate with respect to the vehicle bracket in the fore/aft direction, it allowed for very little vertical travel, and almost no lateral or "tilt" travel. Accordingly, an unacceptable amount of vibration was transmitted to the passenger compartment. Additionally, these prior art mounts contained several different components that required individual manual installation, thereby adding to the overall assembly costs for the automotive vehicle.

Thus, given the above noted disadvantages of prior art vibration damping mounts, it is desirable to provide an isolation mount for a hydraulic brake system which lessens the transmission of noise and vibrations to a passenger compartment in an automotive vehicle while still adequately supporting hydraulic braking equipment to a bracket.

SUMMARY OF THE INVENTION

The present invention is a vibration isolation mount particularly useful for supporting a brake system accumulator plate on a bracket such that transmission of vibration from the accumulator plate to the bracket is minimized and yet movement of the plate relative to the bracket is restrained. Consequently, the bracket and plate can be mounted adjacent other components without risking damage to such components by contact from the plate. Additionally, the isolation mount of the present invention reduces assembly times and costs by utilizing a bolt/washer assembly which may be preassembled.

In a preferred embodiment of the invention, the isolation mount of the present invention includes a shear mount, a rate washer, a bolt and a nut. The shear mount includes a central bore which retains a spacing collar, an accumulator plate contacting member and a rate washer contacting member, all of which are connected by an annular rib, and at least one rate bump positioned on the accumulator plate contacting member. The rate washer includes a central bore and a raised stack positioned around a periphery of the rate washer. Preferably, over-mold bumps are positioned in the central bore of the rate washer and are used to retain the bolt in the rate washer prior to assembly of the mount.

The mount is installed by seating the shear mount in an aperture in the vehicle bracket with the accumulator plate contacting member facing the inner side of the vehicle bracket and the rate washer contacting member facing the outer side of the vehicle bracket. The rate washer is then positioned on the outer side of the vehicle bracket such that the bolt protrudes through the shear mount central bore and a corresponding aperture on the accumulator plate. The nut is then fastened upon the bolt, thereby urging the accumulator plate inward until the spacing collar contacts the rate washer and the inner side of the accumulator plate. Thus, when the accumulator plate begins to move or vibrate in the fore/aft or lateral (tilt) direction, the rate bumps and the height of the rate washer stack control movement within an acceptable level. Similarly, when the accumulator plate begins to move or vibrate in a vertical direction, the shape and thickness of the annular rib operates to control movement within an acceptable level.

Accordingly, it is an object of the present invention to provide an isolation mount for a hydraulic brake system which minimizes transmission of vibration from the accumulator plate to the support bracket, but prevents excessive gyrations of the accumulator plate; an isolation mount which enables an accumulator plate to be mounted closely adjacent other components without contacting them during operation; and an isolation mount which is inexpensive to manufacture yet robust enough to be employed in automotive applications.

DESCRIPTION OF THE PREFERRED EMBODIMENT

Figure 1:
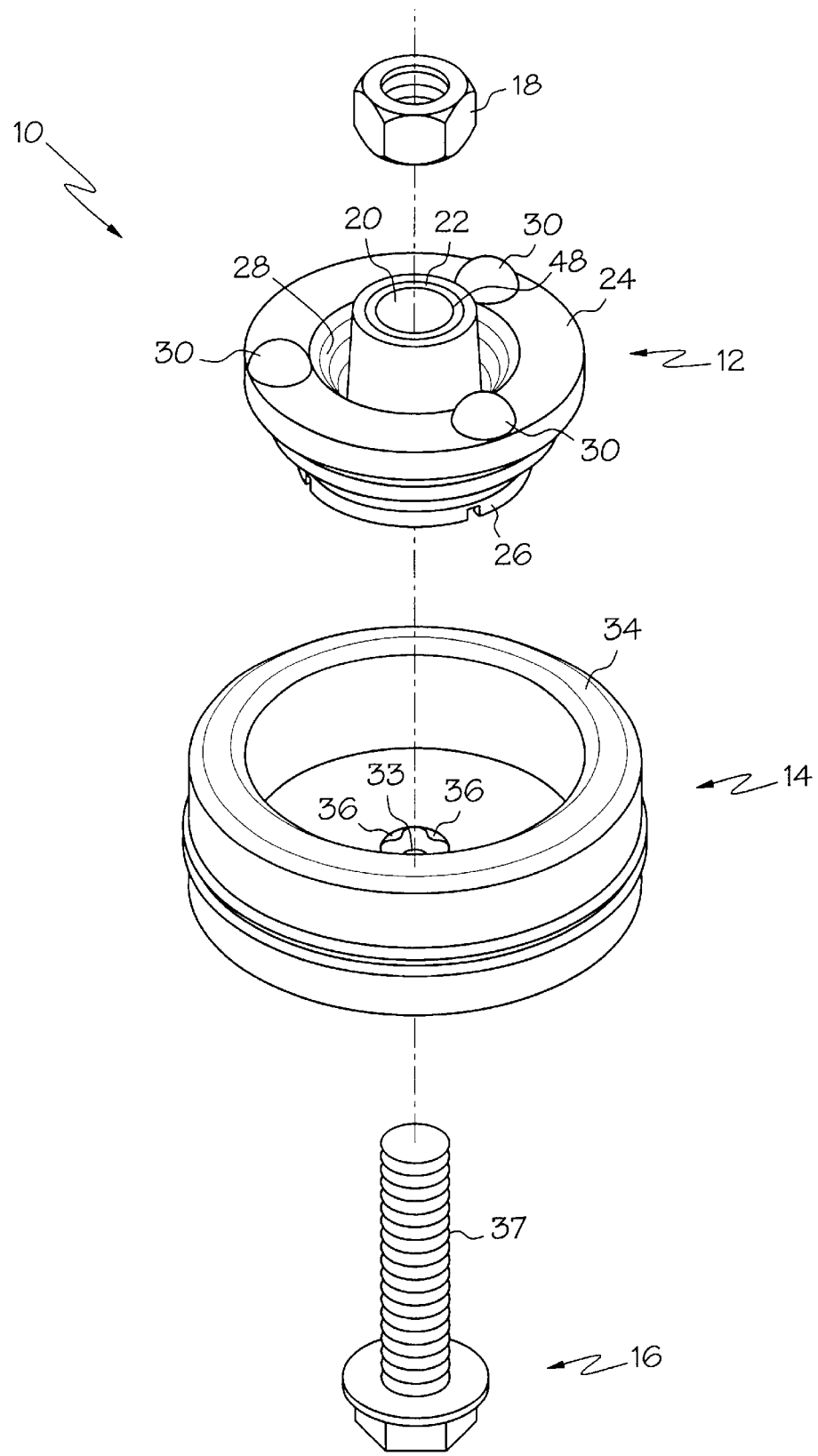
FIG. 1 is an exploded perspective view of a preferred embodiment of the vibration damping isolation mount of the present invention.
Figure 4:
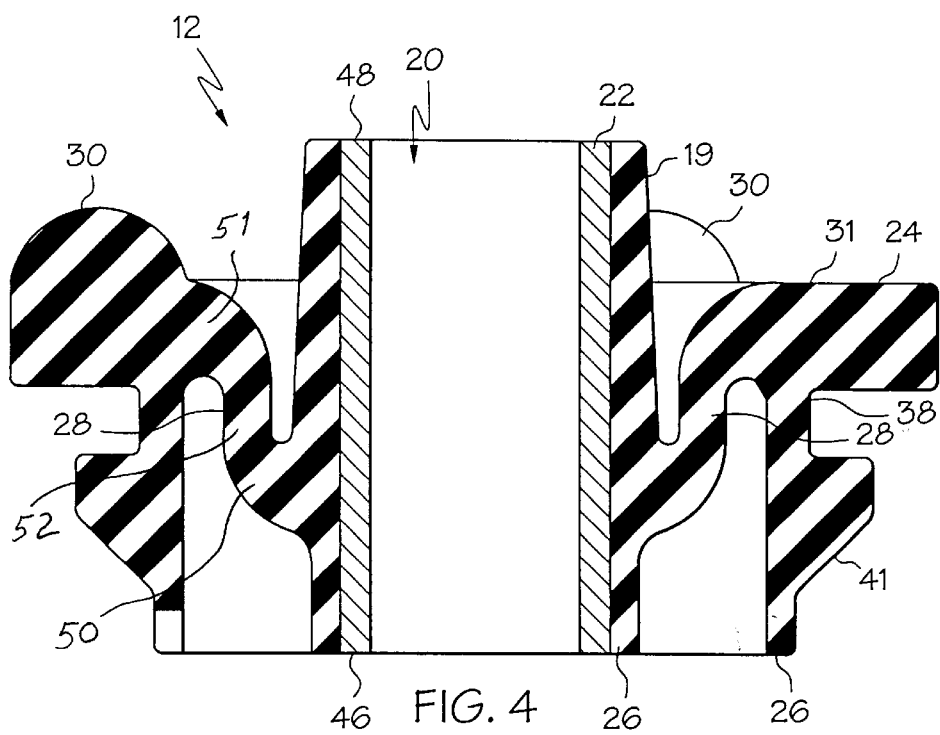
FIG. 4 is a side elevational view in section of the shear mount taken along line 4—4 of FIG. 3.

As shown in FIG. 1, the vibration isolation mount of the present invention, generally designated 10, includes a shear mount 12, a rate washer 14, a bolt 16 and nut 18. As shown in FIGS. 1 and 4, the shear mount 12 includes a tubular portion 19 forming a central bore 20, a Spacing collar 22 fitted in the bore 20, an upper contacting member, which in the preferred embodiment is an accumulator plate contacting member 24 and a lower contacting member, which in the preferred embodiment is a rate washer contacting member 26. The accumulator plate contacting member 24 and tubular portion 19 are connected by a flexible annular rib 28. Annular rib 28 has a curvilinear cross-sectional shape with a first lateral portion 50 connected to the tubular portion 19, a second lateral portion 51 connected to the accumulator plate contacting member 24 and a middle portion 52 connecting the first and second lateral portions and extending in an axial direction relative to tubular portion 19 and accumulator plate contacting member 24. As seen, no stiffening member is used with annular rib 28. Three hemispherical-shaped rats bumps 30 are formed on the upper surface 31 of the accumulator plate contacting member 24, and are spaced evenly about it.

Figure 5:
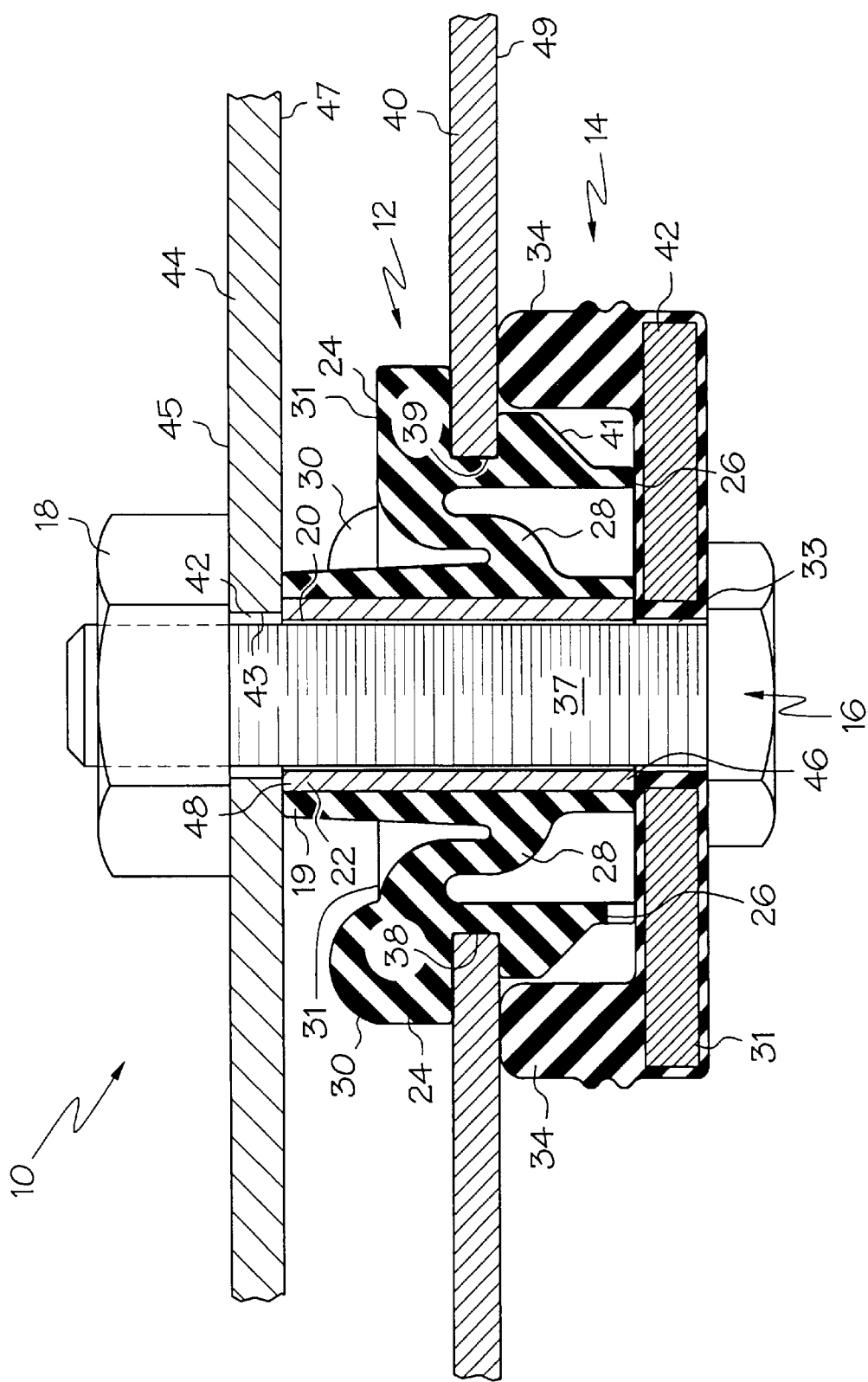
FIG. 5 is a side elevational view in section of the vibration damping isolation mount of FIG. 1.
Figure 6:
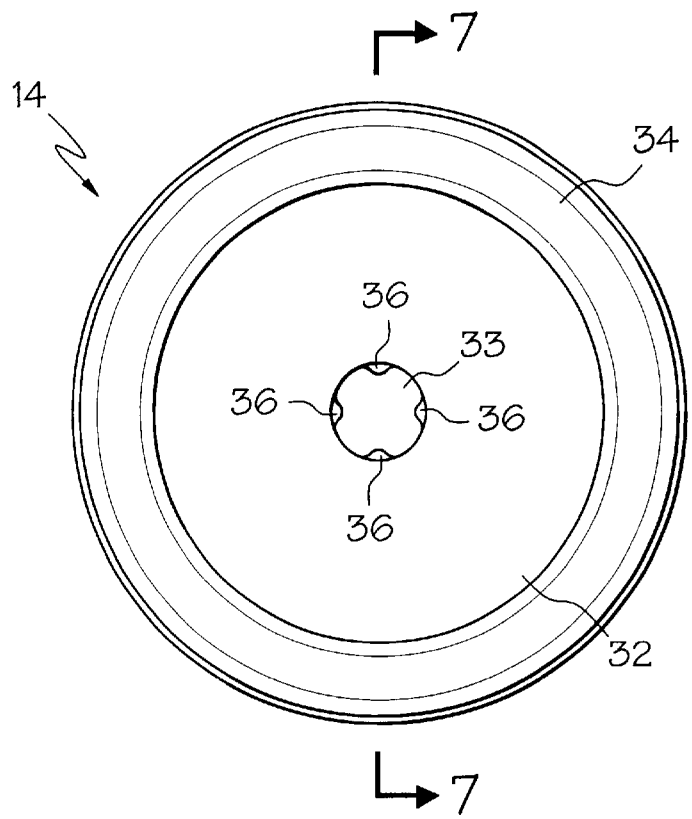
FIG. 6 is a top plan view of a rate washer of the vibration damping isolation mount of FIG. 1.
Figure 7:
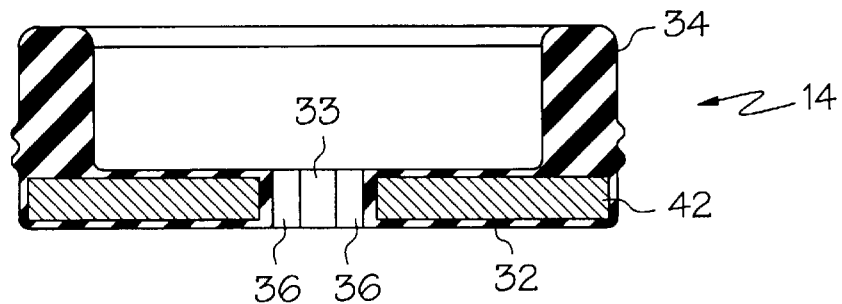
FIG. 7 is a section view of the rate washer taken along line 7—7 of FIG. 6.

As shown in FIGS. 1, 6 and 7, the rate washer 14 includes a disk-shaped base 32 having a central bore 33 and a cylindrical stack 34 positioned about a periphery of the base, together forming a cup sized to receive the shear mount 12 therein (see FIG. 5). Over-mold bumps 36 are positioned in the central bore 33 of the base 32 and extend radially inwardly sufficiently to retain the shank 37 of the bolt 16 in the rate washer 14 prior to assembly of the mount 10. The accumulator plate contacting member 24 includes an annular recess 38 shaped to receive the bore 39 of a mounting bracket, such as a vehicle bracket 40 (see FIG. 5). An inclined wall 41 facilitates insertion of shear mount 12 into the bore 39.

Figure 2:
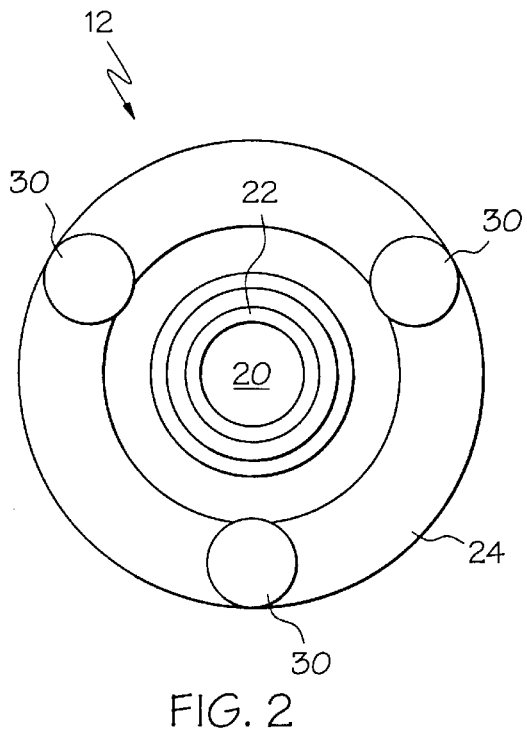
FIG. 2 is a top plan view of a shear mount for use in the vibration damping isolation mount of FIG. 1.
Figure 3:
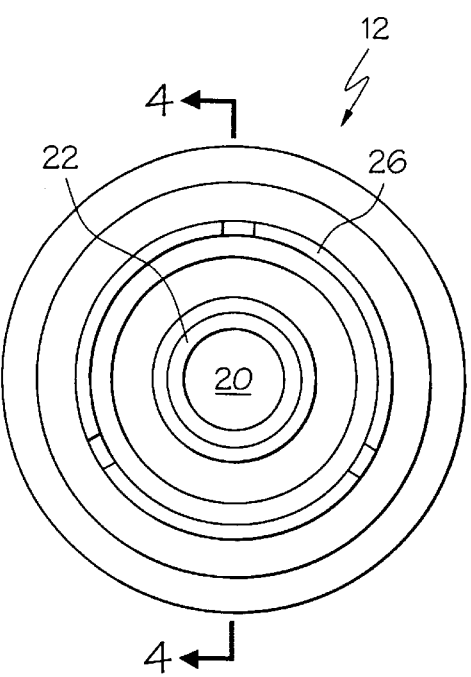
FIG. 3 is a bottom plan view of the shear mount of FIG. 2.

The shear mount 12 (see FIGS. 2, 3 and 4) is made of a highly flexible material such as rubber or neoprene. Additionally, the spacing collar 22 preferably is made of a relatively rigid material such as carbon steel and is secured in the central bore 20 of the tubular portion 19 by an adhesive such as epoxy glue. The spacing collar 22 preferably is sized so that there is some clearance between the inner diameter of the spacing collar 22 and the outer diameter of the shank 37 of the bolt 16. This construction is preferred in that the clearance fit of the spacing collar 22 and the flexibility of the shear mount 12 allow some vibration absorbing movement in the lateral (tilt) and the fore/aft directions, while the stiffness of the spacing collar 22 provides adequate support for the associated hydraulic equipment (not shown), which will be discussed in detail below.

The base 32 of the rate washer 14 (see FIGS. 6 and 7) includes a metal washer 42 enclosed in rubber, which also forms the stack 34. This construction is preferred to an all rubber construction in that the metal washer 42 gives the rate washer 14 the requisite degree of stiffness to support the associated hydraulic equipment (not shown). Additionally, the rubber coating on the metal washer 42 helps to dampen the transmission of vibrations and prevents undesirable metal to metal contact between the rate washer 14 and any associated metal components.

As shown in FIG. 5, the mount 10 is installed on mounting bracket 40 by seating the shear mount 12 in the aperture 39 formed in the vehicle bracket such that the accumulator plate contacting member 24 faces the inner side of the vehicle bracket and the rate washer contacting member 26 faces the outer side of the vehicle bracket. The rate washer 14 is then positioned on the outer side of the vehicle bracket 40 such that the bolt 16 protrudes through the shear mount central bore 20 and a corresponding aperture 43 on an accumulator plate 44, which is part of an automotive hydraulic braking system. The nut 18 is then fastened on the bolt shank 37, thereby urging the outer side 45 of the accumulator plate 44 inwardly until the spacing collar 22 contacts the rate washer 14 at end 46 and the inner side 47 of the accumulator plate 44 at opposite end 48. This procedure is then repeated for each mount 10 necessary to adequately secure the accumulator plate 44 to the vehicle bracket 40. It should be noted that, although the number of mounts 10 used to secure an accumulator plate to a vehicle bracket may vary depending upon the application, the number of mounts 10 that are used in a preferred embodiment is four.

In operation, the isolation mount 10 of the present invention performs as follows. When the accumulator plate 44 moves or vibrates in the fore/aft or lateral (tilt) directions in response to the operation of associated hydraulic equipment (not shown), the inner side 47 of the accumulator plate contacts the rate bumps 30 of the accumulator plate contacting member 24 which act to dampen the unwanted vibrations. Additionally, some of the vibrations from the hydraulic equipment (not shown) which are transmitted through the spacing collar 22 and bolt 16 to the rate washer 14 are dampened by the raised stack 34 which contacts and is urged against the inner side 49 of the vehicle bracket 40. That contact also limits the movement of the accumulator plate 44 relative to the bracket 40. Additional vibration damping is provided by the engagement between contacting member 26 and base 32. Accordingly, the movement and vibration of the accumulator plate 44 with respect to the vehicle bracket 40 can be controlled within acceptable limits by adjusting the height, shape and thickness of the rate washer stack 34; the number, height, and shape of the rate bumps 30; and by altering the materials used to fabricate these components. Similarly, when the accumulator plate 44 vibrates in the vertical direction, the vibrations are dampened by the annular rib 28. Thus, as with the rate bumps 30 and the raised stack 34, the shape, thickness, and material characteristics of the annular rib 28 can be altered to control vertical movement and vibrations of the accumulator plate 44 within a desired level.

While the form of the apparatus herein described constitutes a preferred embodiment of the invention, it is to be understood that the invention is not limited to this precise form of apparatus, and that changes may be made therein without departing from the scope of the invention.

What is claimed is:

1. A vibration isolation mount for connecting a vibrating member to a support structure, the mount comprising:
   a shear mount shaped to be seated in a support structure and including an upper contacting member positioned between said vibrating member and said support structure, a lower contacting member extending downwardly from said support structure, and a tubular portion having a central bore, the tubular portion being movable relative to the upper contacting member and the lower contacting member and being connected to the upper contacting member by an annular rib;
   a spacing collar retained in said bore;
   a rate washer having a base with a bore therethrough and having a raised stack positioned about a periphery of said washer to contact said support structure; and
   a fastener shaped to extend through said rate washer bore and said shear mount bore to connect upper contacting member to said rate washer and attach said mount to said vibrating member, such that vibrations of said vibrating member in a downward vertical direction are dampened by said shear mount, vibrations of said vibrating member in an upward vertical direction are dampened by said rate washer, and vibrations causing said vibrating member to pitch and yaw relative to said support structure are borne by said upper contacting member;
   the annular rib including no stiffening insert and having a curvilinear cross-sectional shape with a first lateral portion connected to the tubular portion, a second lateral portion connected to the upper contacting member and a middle portion connecting the first and second lateral portions and extending in an axial direction relative to the tubular portion and upper contacting member, whereby the shear mount provides low rate shear control of low amplitude lateral vibrations of the vibrating member.

2. The mount of claim 1 wherein said upper contacting member includes a rate bump extending toward said vibrating member.

3. The mount of claim 2 wherein said upper contacting member includes a plurality of said rate bumps spaced about said shear mount bore.

4. The mount of claim 2 wherein the shape, thickness, and number of said rate bumps and the shape and thickness of said rate washer stack are selected to control fore/aft and lateral travel of an accumulator plate with respect to a vehicle bracket within plus or minus four millimeters.

5. The mount of claim 1 wherein the shape and thickness of said annular rib is selected to control vertical travel of said vibrating member with respect to a support structure within plus or minus five millimeters.

6. The mount of claim 1 wherein said rate washer includes an over-mold bump extending into said rate washer bore for retaining said fastener in said rate washer bore.

7. The mount of claim 1 wherein said fastener is a bolt and nut combination.

8. The mount of claim 1 wherein said spacing collar is made of a carbon steel.

9. The mount of claim 1 wherein said rate washer includes a plurality of over-mold bumps extending into said rate washer bore.

10. The mount of claim 1 wherein said shear mount is made of neoprene.

11. The mount of claim 1 wherein said rate washer base includes a metallic component coated with EPDM.

12. A vibration isolation system for securing a brake system accumulator plate to a mounting bracket in an automotive vehicle comprising:
    an accumulator plate;
    a vehicle bracket;
    a shear mount shaped to be seated in an aperture formed in said vehicle bracket, said shear mount including an accumulator plate contacting member, a rate washer contacting member and a tubular portion having a bore in which a spacing collar is retained, the tubular portion being movable relative to the accumulator plate member and the rate washer contacting member and being connected to the accumulator plate contacting member by an annular rib;
    a rate washer including a central bore and having a raised stack positioned around a periphery of said rate washer to contact an outer side of said vehicle bracket;
    at least one rate bump formed on said accumulator plate contacting member positioned to contact an inner side of said accumulator plate;
    a bolt shaped to protrude through said rate washer bore, said shear mount central bore, and an aperture on said accumulator plate; and
    a nut for engaging said bolt, wherein when said nut is fastened to said bolt said spacing collar engages said rate washer and said accumulator plate inner side, thereby securing said accumulator plate in a relatively fixed position with respect to said vehicle bracket;
    the annular rib having a curvilinear cross-sectional shape with a first lateral portion connected to the tubular portion, a second lateral portion connected to the upper contacting member and a middle portion connecting the first and second lateral portions and extending in an axial direction relative to the tubular portion and upper contacting member, whereby the shear mount provides low rate shear control of low amplitude lateral vibrations of the accumulator plate.

13. The vibration damping system of claim 12 wherein said spacing collar is made of carbon steel.

14. The vibration damping system of claim 12, wherein said rate washer includes at least one over-mold bump which protrudes into said rate washer central bore said for retaining said bolt in said rate washer central bore.

15. The vibration damping system of claim 12 wherein said rate washer includes a base having a metallic which is coated in EPDM.

16. The vibration damping system of claim 12 wherein the shape and thickness of said annular rib is selected to control vertical travel of said accumulator plate with respect to said vehicle bracket within plus or minus five millimeters.

17. The vibration damping system of claim 12, wherein said rate bumps are spaced equidistantly around said shear mount central bore.

18. The vibration damping system of claim 12 wherein at least three rate bumps are positioned on said shear mount accumulator plate contacting member.

19. The vibration damping system of claim 12 wherein the shape, thickness, and number of said rate bumps and the shape and thickness of said rate washer stack are selected to control fore/aft and lateral travel of said accumulator plate with respect to said vehicle bracket within plus or minus four millimeters.

20. The vibration damping system of claim 12 wherein said rate washer includes four over-mold bumps spaced from each other extending in said bore for retaining said bolt in said rate washer bore.

21. The vibration damping system of claim 12 wherein said shear mount is made of neoprene.

* * * * *